United States Patent [19]

Veres

[11] 3,734,702

[45] May 22, 1973

[54] GLASS SEALING METHOD
[75] Inventor: Frank Veres, Toledo, Ohio
[73] Assignee: Owens-Illinois Inc., Toledo, Ohio
[22] Filed: May 3, 1971
[21] Appl. No.: 139,900

Related U.S. Application Data

[63] Continuation-in-part of Ser. No. 860,433, Sept. 23, 1969, Pat. No. 3,645,839, which is a continuation-in-part of Ser. No. 790,465, Jan. 10, 1969, abandoned.

[52] U.S. Cl. ................65/43, 65/36, 161/193, 313/201
[51] Int. Cl. ................C03c 27/00, C03c 29/00
[58] Field of Search ..............65/43, 36; 161/193, 161/169; 313/201

[56] References Cited

UNITED STATES PATENTS 3,499,167   3/1970   Baker et al. ..................313/220
3,559,190   1/1971   Blitzer et al. ..................313/201

OTHER PUBLICATIONS

Manners et al., Abstract of the Application, Ser. No. 709,432, published May 29, 1951; G4G O.G. 1695.

*Primary Examiner*—S. Leon Bashore
*Assistant Examiner*—Kenneth M. Schor
*Attorney*—Donald K. Wedding and E. J. Holler

[57] ABSTRACT

A crystallizable fusion-type glass sealing composition, such as lead borosilicate or lead-zinc-borate solder glass, having incorporated therein from about 1 to about 18 percent by weight of aluminum titanate; which composition is used as a sealing glass. The aluminum titanate inhibits crystallization, thus allowing for more time for sealing parts without developing a seal with uneven stress concentration due to crystallization.

9 Claims, No Drawings

GLASS SEALING METHOD

RELATED APPLICATIONS

This is a continuation-in-part of my U.S. Pat. application Ser. No. 860,433, filed Sept. 23, 1969, now U.S. Pat. No. 3,645,839 issued Feb. 29, 1972, which is a continuation-in-part of my U.S. patent application Ser. No. 790,465, now abandoned filed Jan. 10, 1969.

THE INVENTION

This invention relates to glass sealing compositions and more particularly to crystallizable glass sealing compositions suitable for effectively sealing a glass surface to another surface including glass, metal, ceramic and like surfaces.

While the easiest method for sealing two glass surfaces together is by fusion of the glass, for glasses used in the electronics industry, the temperature to which the surfaces must be subjected in order to soften each surface sufficiently to cause it to flow and fuse with the glass of the other surface is extremely high with respect to the sensitive parts involved. Depending upon the particular glass composition, this temperature may be as high as 2,200° – 2,600°F. If the glass surfaces to be fused are part of an article containing delicate and sensitive components, such as a cathode ray tube having a cathodoluminescent surface deposited on the face plate and a cathode-ray electronic gun assembly within the funnel portion of the tube, it is necessary to seal the surfaces of the glass face plate and glass funnel at a temperature lower than that which would detrimentally affect the heat-sensitive components within the articles and/or soften or collapse the glass envelopes. To achieve this sealing, solder glasses such as lead borosilicate and lead-zinc-borate glasses, for example, have been developed by the art. Such solder glasses have a softening point which is considerably lower than the annealing temperature of the glass surfaces being sealed so that the glass surfaces may be safely subjected to this lower temperature for a period of time sufficient to cause the solder glass to soften and flow into and fill the space between the surfaces to form a durable seal upon cooling of the parts, without detrimentally affecting the contents of the article being sealed.

A thermally crystallizable sealing glass is applied by flowing or brushing a slurry comprising the finely divided sealing glass particles in an organic vehicle onto one or both of the glass particles in an organic vehicle onto one or both of the glass surfaces to be sealed. The surfaces are then placed in contact with each other and subjected to a temperature above the softening point of the sealing glass, causing it to flow and wet the surfaces to be sealed while volatilizing the vehicle. Since this temperature is below the annealing temperature of the surfaces being sealed, there is no distortion or deformation of the glass surfaces, nor is there any collapse of the glass article, such as a glass envelope, being sealed. The sealing temperature is maintained for a sufficient period of time to accomplish the desired crystallization, and the sealed surfaces are then cooled to ambient temperature.

It is also known that the relationship of the sealing glass and the glass being sealed has to be such that the solder glass can perform its sealing function without creating any detrimental stresses between the seal and the surfaces being sealed. The most satisfactory results are generally obtained when the coefficient of thermal contraction of the solder glass composition is slightly less than the coefficient of thermal contraction of the surfaces being sealed, so that the sealing glass is in a moderate degree of compression. However, the solder glasses known to the art that have the desired characteristics enumerated below have coefficients of thermal contraction which are at best very slightly lower than or, worse, slightly greater than that of the surfaces being sealed. As a consequence, the sealing glass is in a state of very low compression or is in tension and, as such, the product is more vulnerable to failure than if the sealing glass were in a moderate degree of compression. The use of refractory oxides and silicates, such as zircon, to modify the expansion characteristics of solder glass so as to make such expansion characteristics more nearly like those of the glass being sealed is also known. However, while these additives do affect the expansion characteristics of the solder glass, they also adversely affect other properties of the solder glass, such as flow properties, crystallization times, etc., and thus make the solder glass unsuitable for certain applications.

Therefore, it is an object of the present invention to provide a sealing glass having an additive therein; which additive lowers the contraction characteristics of the sealing glass but does not adversely affect the other properties of the sealing glass.

It is a further object of this invention to provide a sealing glass composition containing an additive which has little or no adverse affect on the flow characteristics of the sealing glass, does not adversely affect the length of time it takes for the sealing glass to crystallize and does not decrease the temperature range within which the glass remains in its glassy state.

In attaining the objects of this invention, the principal feature resides in the use of a small amount of aluminum titanate which is incorporated in the sealing glass and which lowers the coefficient of thermal contraction of the sealing glass without adversely affecting the other important properties of the sealing glass.

Other objects, features and advantages will become more apparent from the following description of the invention.

It has been found that aluminum titanate can be added to sealing glasses, of which crystallizable solder glasses are an example, without materially affecting the basic properties of the glass other than sufficiently lowering the coefficient of thermal contraction so that it is lower than that of the glass being sealed. Among the solder glasses for which the present invention is applicable are the lead borosilicate and lead-zinc-borosilicate glasses having a sealing temperature below the deformation temperature of the material to which they are to be sealed.

It should be appreciated that the amount of aluminum titanate selected for addition to the sealing glass can be varied over a fairly broad range. Thus, even as little as 1 – 2 percent by weight thereof is reflected in a lowering of the coefficient of contraction. Increasing amounts, particularly above 25 percent by weight, generally will have an affect on the viscosity of the glass; that is, the viscosity will increase. However, for some applications, the increase in viscosity is not a significant factor. Furthermore, even where viscosity is a factor in the specific application, the particular glass can be selected or batch ingredients added, deleted or adjusted to accommodate the presence of the aluminum titanate in order to achieve the desired tailored lowering of the coefficient of contraction.

Best results are obtained, particularly with glasses containing appreciable amounts of lead oxide, when about 1 to about 18 weight percent, preferably about 3 to about 15 weight percent, more preferably about 5 to about 12 weight percent, of finely divided aluminum titanate is incorporated within the finely divided sealing glass composition and the mixture agitated until a uniform blending or dispersion of the additive occurs. Thus, the sealing glass composition should be selected which has thermal contraction characteristics close to that of the glass surface being sealed. By adding the aluminum titanate to the sealing glass in a predetermined amount, the coefficient of thermal contraction of the sealing glass is accordingly lowered, but the other properties of the glass, including flow properties and crystallization times, remain substantially unchanged. While a relatively large amount of aluminum titanate can be present in the sealing glass composition, and the coefficient of thermal contraction of the sealing glass lowered even more, the ability of the sealing glass to flow and wet the surfaces being sealed gradually diminishes at the glass-sealing temperature. However, this ability to flow is still greater than in a sealing glass containing zircon as the additive.

Sealing glass compositions particularly suitable for purposes of this invention come within the following formulation wherein the ingredients are set forth in weight percent, based on the total weight of the sealing glass composition.

TABLE 1

| Ingredients | Weight Percent |
|---|---|
| PbO | 70 – 82 |
| ZnO | 1 – 20 |
| $B_2O_3$ | 5 – 20 |
| $SiO_2$ | 0 – 5 |
| $Al_2O_3$ | 0 – 3 |
| BaO | 0 – 5 |
| $CaF_2$ | 0 – 2 |
| CaO | 0 – 5 |
| MgO | 0 – 5 |
| $SnO_2$ | 0 – 4 |

There is added to the sealing glass composition about 1 to about 18 weight percent of aluminum titanate, based on the total weight of the resulting fusion-type composition (sealing glass plus aluminum titanate).

Oxides such as $K_2O$, CuO, $Bi_2O_3$ and similar fluxes, colorants and the like may also be included in the resulting glass composition in minor amounts which will not materially affect the basic characteristics of the glass, e.g., up to about 2 weight percent based on the total weight of the resulting glass.

Aluminum titanate is prepared by any suitable method. One method comprises ball-milling 5,555 parts by weight of alumina (Alcoa A–10) and 3514.5 parts by weight of $TiO_2$ (Frit maker's grade obtained from Titanium Alloy Manufacturing Company) for 26 hours in an alumina-fortified porcelain jar mill using alumina-fortified porcelain balls as grinding media. The alumina and the titania were more than 99.5 percent pure with traces of a few other ingredients therein. The mixture was then placed in a platinum crucible the crucible was placed in a gas-fired crucible furnace which was maintained at a slightly oxidized condition, i.e., 0.5 to 1 percent excess $O_2$, at a temperature of 2,700°F. for 40 hours. The crucible was then removed from the furnace and allowed to cool to room temperature. The sintered product was then ball-milled for 31½ hours until a fine powder was formed having an average particle size of –200 mesh. An analysis of the product showed a trace of alpha-alumina and a very minor quantity of rutile. Substantially all of the mixture was aluminum titanate.

It has been found that aluminum titanate suitable for the present invention can be produced in accordance with the above method by using from 55 to 65 parts by weight alumina and from 45 to 35 parts by weight $TiO_2$ without any discernible change in the essential properties of the sealing glass mixture.

A comparison of applicant's sealing glass composition containing aluminum titanate with a zircon-containing solder glass was made. Zircon, like aluminum titanate, is essentially alkali-free. Also, zircon is one of the most chemically inert and one of the most solution-resistant additives in the solder glass art. A solder glass which has enjoyed widespread commercial acceptance was used for the comparison tests. The glass has the following composition:

TABLE 2

| Ingredients | Weight Percent |
|---|---|
| $SiO_2$ | 2.1 |
| $B_2O_3$ | 8.13 |
| BaO | 2.0 |
| ZnO | 12.6 |
| PbO | 75.0 |

Several samples were prepared using the above sealing glass and respectively 1, 2.5, 5 and 10 percent by weight aluminum titanate, 1 and 5 percent by weight milled zircon and 1 and 5 percent by weight Superpax A; the latter being the trademark for a well-known finely ground zircon.

The sealing glass compositions having the additives uniformly blended therein were then tested to ascertain (1) the glassy range, (2) the time required at a firing temperature of 450°C. before crystallization took place, (3) the seal stress which occurred when each glass was sealed to a reference glass and (4) the flow characteristics of the glass at the sealing temperature.

The flow characteristics of the glass were measured by the standard Button Flow Test used by suppliers and consumers of solder glass in the color television industry. A 10 gram sample of the glass is pressed at 2,000 psi into an annular tablet having a diameter of 0.75 inches. The tablet is then heated at the rate of 7.5°C. per minute to a temperature of 450°C. and is held at this temperature for 1 hour. The diameter of the fused button is then measured after the button has cooled. This measurement is an index of the flowability of the glass.

In measuring the time it takes for the sealing glass to crystallize once it has reached a temperature of 450°C., the glass is subjected to a Differential Thermal Analysis (DTA). The finely divided sealing glass is heated at the rate of 10°C. per hour to a temperature of 450°C. As soon as this temperature is reached, the time is noted. The glass is then maintained at 450°C. When crystallization of the glass occurs, there is an exothermic reaction. By means of thermocouples placed within the sample, the sharp peak or rise in the solder glass temperature is noted as soon as crystallization occurs. Upon completion of crystallization, the temperature drops suddenly. The length of time at which the glass was held at 450°C. until the temperature peaked is the measure of the time of crystallization. The longer the time at the sealing temperature before crystallization occurs, the less stringent the temperature control problem is to the user.

The stresses which are formed when the sealing glass is sealed to a glass surface are measured by the Rod Seal Stress Test. A glass rod with a known thermal contraction coefficient and having a diameter of about one-quarter inch has two of its opposite surfaces ground flat and parallel adjacent to one end thereof. A mixture of the sealing glass being tested and a liquid vehicle serving as a fugitive or temporary binder therefor (nitrocellulose in amylacetate, for example) is applied to the end of the glass rod and the rod and sealing glass are fired at 450°C. for 1 hour. The stress at the interface is determined by measuring the retardation of polarized light. When the sealing glass undergoes a smaller total contraction than does the reference glass, the reference glass exerts a force on the sealing glass, thus placing the sealing glass in a state of compression. When the sealing glass contracts to a greater extent than does the reference glass, the reference glass exerts an outward pull on the sealing glass, thus placing the sealing glass in a state of tension. In the Rod Seal Stress Tests which were conducted to ascertain the information set forth in Table 3, infra, the glass rods had the composition expressed in weight percent of 63.5% $SiO_2$, 4.4% $Al_2O_3$, 7.3% $Na_2O$, 5.2% CaO/MgO, 7.5% BaO, 10.3% $K_2O$, with minor amounts of $Sb_2O_3$, $As_2O_3$, PbO, $Li_2O$, $CeO_2$, F, $Rb_2O$, $O_2$, and $Fe_2O_3$ making up the remainder of the composition. The glass had a fiber softening point of 690°C., an annealing point of 488°C., a strain point of 450°C., a coefficient of thermal expansion of $98.5 \times 10^{-7}$/°C. (0° – 300°C.) and a coefficient of thermal contraction of $119 \times 10^{-7}$/°C. (from annealing point to 25°C.).

The glassy range of the sealing glass, i.e., the temperature range within which the sealing glass remains in a fused or molten state, is ascertained by the Gradient Boat Test. Finely divided sealing glass is placed into a gradient boat which is then placed into a hot gradient furnace wherein different parts of the boat are simultaneously subjected to different temperatures for a period of time with the lowest temperature applied to one end of the boat and the temperature progressively increasing with the highest temperature being applied at the other end of the boat. After one hour, the gradient boat is removed from the furnace and the contents allowed to cool for visual examination. That portion of the sealing glass subjected to the low temperatures is usually still in powdery form, but that portion adjacent thereto which has been subjected to a higher temperature has become sintered. In further examining the gradient test specimen, the temperature at which the sealing glass turned from sintered powder to fused glass can be readily ascertained visually. This is known as the glassy edge (GE) temperature. The point at which the sealing glass turned from fused glass to crystalline ceramic is also readily ascertained visually. This temperature is referred to as the crystalline edge (CE) temperature. The difference in temperature (°C.) between the glassy edge and the crystalline edge is the glassy range of the sealing glass.

It is important to have the glassy range as broad as possible. The time within which the sealing glass can be kept at the sealing temperature before crystallization occurs should also be as long as possible. This becomes important in the process of sealing cathode ray tubes, such as television tubes, wherein temperature differentiations across the tube may exist during the sealing process. If the crystallization time is too short, part of the bulb may be having the sealing glass undergo devitrification or crystallization while the other part of the bulb may have the sealing glass still in a glassy state. If the glassy range is too narrow, it is possible to have the glass crystallize before it has had an opportunity to completely flow and thoroughly wet the surfaces to be sealed.

The following table sets forth the comparative data pertaining to the aforementioned sealing glass, per se; the sealing glass containing the various amounts of aluminum titanate and the sealing glass containing the various amounts of zircon and Superpax A.

TABLE 3

| Example | Solder Glass with % by Weight Additive | Glassy Range °C. | Time to Isothermal Peak (minutes) | Button Flow Inches | Rod Seal Stress Compression (psi) |
|---|---|---|---|---|---|
| 1 | no additive | 59 | 21 | 1.12 | 800 |
| 2 | 1% Aluminum Titanate | 60 | 23.5 | 1.10 | 1700 |
| 3 | 2.5% Aluminum Titanate | 60 | 25 | 1.10 | 1900 |
| 4 | 5% Aluminum Titanate | 53 | 25 | 1.07 | 2600 |
| 5 | 10% Aluminum Titanate | 48 | 27 | 1.02 | ¹ |
| 6 | 1% Zircon | 50 | 15 | 1.07 | 1050 |
| 7 | 5% Zircon | 41 | 9 | 0.98 | 2300 |
| 8 | 1% Superpax A | 47 | 13 | 1.06 | 1150 |
| 9 | 5% Superpax A | 44 | 9 | 0.96 | 1900 |

¹Seal failed due to high stress.

From the above table, it is seen that the glassy range for the solder glass having 1 and 2.5 percent aluminum titanate is substantially the same as that of the solder glass per se. The solder glass containing 1% zircon or 1% Superpax A has its glassy range reduced by 9° and 12°C., respectively. While the presence of 5% aluminum titanate decreases the glassy range of the solder glass by only 6°C., 5% zircon decreases the glassy range by 18°C. and 5% Superpax A decreases the glassy range by 15°C.

Also, from the above table, it is seen that the presence of the aluminum titanate unexpectedly increases the time for the sealing glass to reach its isothermal peak (i.e., the time it remains in the fluid state before it crystallizes) by as much as 30 percent. This increase in time during which the solder glass is in the liquid state is of importance to commercial users in that it gives them a greater flexibility in their sealing processes, particularly in sealing color television picture tubes. Zircon, on the other hand, considerably decreased the time that the sealing glass remained in the fluid state; the decrease being approximately 30 to 60 percent, depending upon whether 1 or 5 percent milled zircon or Superpax A was present.

Also from the above table, while the flow characteristics of the solder glass, as indicated by the Button Flow Test, are substantially maintained when 1 percent or 2½% aluminum titanate is present, and even when 5% aluminum titanate is present, it is to be noted that the presence of the zircon or the Superpax A materially affects these flow characteristics when compared to the same amount of aluminum titanate.

From the foregoing table, it is seen also that the aluminum titanate produces substantially more of a compressive stress in the sealing glass sealant material than does the corresponding amount of zircon or Superpax A.

It has been found in commercial practice that many product losses are usually traced to and found to originate in the sealing glass sealant. A controlled increase in the compressive stress level of the sealant decreases its vulnerability and, consequently, decreases the product losses even though the tensile stress in the base glass has correspondingly increased.

The primary purpose of additives is to induce a controlled, moderate level of compressive stress in the sealant glass. Test results summarized in the above table show that very small amounts of aluminum titanate significantly increase the compressive stress in the sealant, that the level of the compressive stress is easily controlled by the amount of additive present and that the aluminum titanate of this invention is more effective in inducing compressive stress than the zircon additive known to the prior art.

The sealing glass compositions of the present invention, being essentially alkali-free, are especially suitable for use in those electronic applications where the presence of alkali is known to be deleterious.

For example, an alkali-free solder glass sealant is necessary to encapsulate microelectronic semi-conductor slips in alumina envelopes.

Table 4 below recites the compositional analysis for a preferred glass sealing composition of the present invention.

TABLE 4
EXAMPLE 10

| Ingredients | Weight Percent |
|---|---|
| $SiO_2$ | 3.5 |
| $B_2O_3$ | 7.5 |
| PbO | 80.6 |
| ZnO | 6.3 |
| BaO | 2.1 |
| Total | 100.0 |
| $Al_2TiO_5$ (aluminum titanate) | 11.9 |
| Colorant | 0.3 |

The above glass has a glassy edge temperature determined by the gradient boat method as described above of 348°C. and a crystal edge temperature of 382°C. The stresses in the sealing glass as determined by the above-described Rod Seal Stress Test reveal compression values of 640 to 660 psi (first run) and from 1,500 to 1,550 psi (second run) at 380°C. and 1,550 to 1,650 psi at 400°C. The flow properties of the sealing glass are fair. The glass rods used in the instant Rod Seal Stress Tests had a composition expressed in weight percent of 70.6% $SiO_2$, 0.2% $B_2O_3$, 2.0% $Al_2O_3$, 0.3% $K_2O$, 13.4% $Aa_2O$, 7.2% CaO, 5.3% MgO, 0.02% $As_2O_3$, 1.0% BaO, 0.07% $Fe_2O_3$ and 0.2% $So_3$. This glass had a fiber softening point of 735°C., an annealing point of 547°D., a strain point of 504°C., a coefficient of thermal expansion of $83 \times 10^{-7}$ in/in/°C. (0°– 300°C.), a coefficient of thermal contraction of $102 \times 10^{-7}$ iin/in/°C. (547°–25° C.) and a density of 2.52 percent.

EXAMPLE 11

Reducing the amount of aluminum titanate in he Example 10 glass to 9 percent yielded a sealing glass of the invention having a glassy edge temperature of 340°C. and a crystalline edge temperature of 381°C. The rod seal stress analysis revealed compression stresses in the sealing glass ranging from 875 psi to 950 psi at 400°C.

EXAMPLE 12

A glass formulated from the same base glass as in Example 10 but containing 18% aluminum titanate possessed a glassy edge temperature of 342°C. and a crystalline edge temperature of 384°C. The rod seal stress analysis revealed compression stresses at 400°C. of 2,500 psi.

A specific compositional analysis representative of a preferred sealing glass composition of particular utility and of the present invention is given in Table 5.

TABLE 5
EXAMPLE 13

| Ingredients | Weight Percent |
|---|---|
| PbO | 82.0 |
| ZnO | 6.0 |
| $B_2O_3$ | 7.0 |
| $SiO_2$ | 3.0 |
| BaO | 2.0 |
| Total | 100.0 |
| Aluminum Titanate | 11.0 |
| Colorant | 0.3 |

The above glass has a coefficient of thermal contraction compatible with that of alumina normally about $80 - 90 \times 10^{-7}$ in/in/°C. over the range 0°– 300°C. and a sealing temperature of 450°C. or below. The sealing glass has extremely desirable flow characteristics whereby sealing and joining of alumina to other components including alumina is readily accomplished. The sealing glass composition can be applied by spraying, silk screening, etc. The assembly is then fired to provide a hermetic seal.

Table 6 contains a recitation of several sealing glass compositions of the invention in which the amount of aluminum titanate is varied.

TABLE 6

| Ingredients | Ex. 14 | Ex. 15 | Ex. 16 |
|---|---|---|---|
| | Weight Percent | | |
| $SiO_2$ | 2.10 | 2.10 | 2.10 |
| $B_2O_3$ | 9.98 | | 9.98 |
| ZnO | | 15.86 | 15.86 |
| PbO | 71.25 | 71.25 | 71.25 |
| $SnO_2$ | 1.00 | 1.00 | 1.00 |
| Aluminum Titanate | 3 | 5 | 7 |

The properties of the sealing glass composition of Table 6 are given in Table 7.

TABLE 7

| Ingredients | Ex. 14 | Ex. 15 | Ex. 16 |
|---|---|---|---|
| Gradient Boat | | | |
| Glassy Edge OC. | 381 | 377 | 378 |
| Crystal Edge OC. | 422 | 419 | 418 |
| D.T.A.* | | | |
| Glassy Edge | 388 | 387 | 388 |
| Crystal Edge | 439 | 432 | 435 |
| Isothermal at 450°C. | | | |
| Time to peak-min. | 8.0 | 6.5 | 7.0 |
| Rod Seal Stress** (psi in sealing glass) at 450°C. | 675C*** | 960C | 1740C |
| Flow | Good | Good | Good |
| Final Blend | Good | Good | Good |

*Differential thermal analysis (described previously).
**Using a transparent glass rod formed of a glass having the same composition as the glass rods described in Example 10.
***Compression.

As can be seen, the properties are very desirable, particularly the compression developed in he sealing glass.

The sealing glasses of the present invention preferably employ in a base glass, to which the aluminum titanate is added, a composition which is selected or formulated to experience fusion, thereby creating the seal at a temperature below the decomposition temperature of the aluminum titanate. This temperature may vary from 750°C. to 1,300°C. Usually, the base glass should have a sealing temperature below the mid point in the range indicated to thereby avoid any deleterious effect initiated or caused by any products or decomposition of the aluminum titanate. Minor amounts of the latter, of course, may be tolerated so that flexibility exists as to the precise temperature within the range defined hereinabove.

In one specific embodiment hereof, this invention is used in the manufacture of multiple gas discharge display panels, especially those which have an electrical memory and which are capable of producing a visual color display including the representation of data such as numerals, letters, television display, radar displays, binary words, etc. More particularly, the composition of this invention has been found to be highly useful in sealing together the components of such panels, especially the glass substrates which support the electrodes and/or other elements.

This invention is particularly useful in the fabrication and manufacture of gas discharge devices of the display/memory type characterized by an ionizable gaseous medium, usually a mixture of at least two gases ag an appropriate gas pressure, in a thin gas chamber or space between a pair of opposed dielectric charge storage members which are backed by conductor (electrode) members, the conductor members backing each dielectric member being transversely oriented to define a plurality of discrete discharge volumes, each of which constitutes a discharge unit. In some prior art panels the discharge units are additionally defined by surrounding or confining physical structure such as by cells or apertures in perforated glass plates and the like so as to be physically isolated relative to other units In either case, without or without the confining physical structure, charges (electrons, ions) produced upon ionization of the gas of a selected discharge unit, when proper alternating operating potentials are applied to selected conductors thereof, are collected upon the surfaces of the dielectric t specifically defined locations and constitute an electrical field opposing the electrical field which created them so as to terminate the discharge for the remainder to the half cycle and aid in the initiation of a discharge on a succeeding opposite half cycle of applied voltage, such charges as are stored constituting an electrical memory.

Thus, the dielectric layers prevent the passage of any conductive current from the conductor members to the gaseous medium and also serve as collecting surfaces for ionized gaseous medium charges (electrons, ions) during the alternate half cycles of the A.C. operating potentials, such charges collecting first on one elemental or discrete dielectric surface area and then on an opposing elemental or discrete dielectric surface area on alternate half cycles to constitute an electrical memory.

An example of a panel structure containing non-physically isolated or open discharge units is disclosed in U. S. Pat. No. 3,499,167 issued to Theodore C. Baker et al.

An example of a panel containing physically isolated units is disclosed in the article by D. L. Bitzer and H. G. Slottow entitled "The Plasma Display Panel — Digitally Addressable Display With Inherent Memory", Proceeding of the Fall Joint Computer Conference, IEEE. San Francisco, California, Nov. 1966, pages 541–547. Also, reference is made to U. S. Pat. No. 3,559,190.

Regardless of whether or not the panel is of the Baker et al. Bitzer et al. or of some other type, it typically is constructed using two flat glass substrates for support of the electrodes and dielectric layer. It has been discovered that this invention is highly suitable for sealing together the two glass substrates so as to provide a hermetically sealed ionizable gas chamber.

I claim:

1. In a process for manufacturing a gaseous discharge panel characterized by an ionizable gaseous medium in a gas chamber formed by the sealing together of two glass substrates, the improvement wherein the substrates are sealed with a fusion-type glass sealing composition maintained at an elevated temperature in the liquid state, said sealing glass consisting essentially of about 70 to about 82 weight percent PbO, about 1 to about 20 weight percent ZnO, about 5 to about 20 weight percent $B_2O_3$, and about 1 to about 18 percent by weight of aluminum titanate, all based on the total weight of the sealing glass, said aluminum titanate effecting an increase of at least 11.9 percent in the time required for said sealing glass to reach its isothermal peak, as compared to the time required for said sealing glass in the absence of aluminum titanate whereby the time available, during which said sealing glass is in the liquid state, to seal said glass substrate is increased.

2. The invention of claim 1 wherein the sealing composition contains about 3 to about 15 weight percent aluminum titanate.

3. The invention of claim 1 wherein the sealing composition contains about 5 to about 12 weight percent aluminum titanate.

4. In a process for sealing a glass surface to another surface by a fusion-type solder glass selected from the group consisting of lead borosilicate glass and lead-zinc-borosilicate glass maintained at an elevated temperature in the liquid state, the improvement comprising incorporating in said solder glass about 1 to about 18 percent by weight, based on the total weight of the solder glass, of aluminum titanate to increase by at least 11.9 percent the time required for said solder glass to reach its isothermal peak as compared to the time required for said solder glass in the absence of aluminum titanate, whereby the time available, during which said solder glass is in the liquid state, to seal said surfaces is increased.

5. The invention of claim 4 wherein said solder glass consists essentially of about 70 to about 82 weight percent PbO, about 1 to about 20 weight percent ZnO, and about 5 to about 20 weight percent $B_2O_3$ in addition to said aluminum titanate, said weight percents being based on the total weight of said solder glass.

6. The invention of claim 4 wherein said solder glass contains about 3 to about 15 weight percent aluminum titanate.

7. The invention of claim 4 wherein said solder glass contains about 5 to about 12 weight percent aluminum titanate.

8. A process for increasing by at least 11.9 percent the time required for solder glass in the liquid state to reach its isothermal peak as compared to the time required for said solder glass in the absence of aluminum titanate, comprising incorporating about 1 to about 18 percent by weight of aluminum titanate in said solder glass, said solder glass selected from the group consisting of lead borosilicate glass and lead-zinc-borosilicate glass.

9. The invention of claim 8 wherein said solder glass consists essentially of about 70 to about 82 weight percent PbO, about 1 to about 20 weight percent ZnO, and about 5 to about 20 weight percent $B_2O_3$ in addition to said aluminum titanate.

* * * * *